United States Patent Office 2,745,755
Patented May 15, 1956

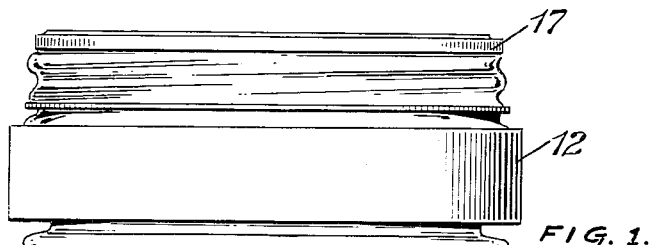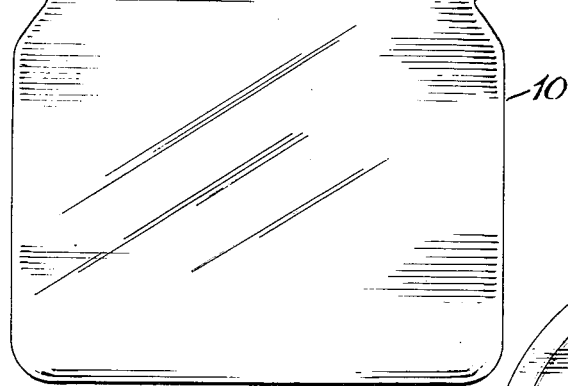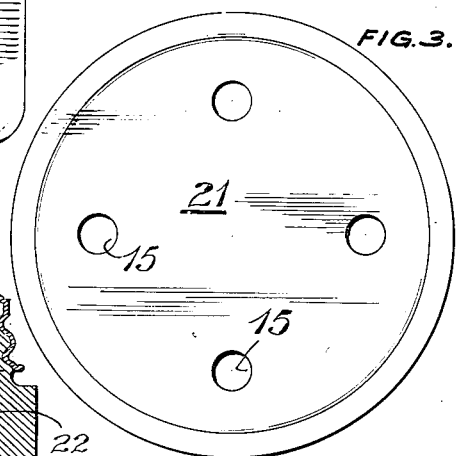

2,745,755

APPARATUS AND METHOD FOR STERILIZING CONTAINERS AND THE FOOD PRODUCTS THEREIN

Earl R. Anderson, Campbell, Calif.

Application June 4, 1953, Serial No. 359,507

8 Claims. (Cl. 99—182)

The above invention relates to the simultaneous sterilizing of food products and the containers in which they are to be canned, and to pre-cooking, thereby providing a desirable, simple and effective method of canning such products with a full liquid level during sterilizing and thereafter.

In the canning of food products, it is customary to place the product to be canned in a container; for example, a conventional glass canning jar, with a desired head space so that the level of liquid will not overflow the container due to the heating of the liquid and the product during the sterilizing operation. Customarily in home canning where no precook or exhaust is employed, certain products are placed in the container and the desired fill of liquid added, and the container with its closure applied thereto is placed in a retort and subjected to a sterilizing temperature. This process is commonly employed with products which sterilize at boiling water temperatures or slightly higher, such as acid fruit products for example. Other products requiring a longer period of cooking for sterilization and a higher temperature are subjected to a pressure sterilizing operation. In general, a greater head space is provided for products requiring pressure sterilization. In commercial canning, with some products, it is common practice to perform an exhausting or pre-cooking of the product in the container to remove entrained gas, among other purposes. In accordance with prior practice in all such operations the level of liquid over the product, whether a fruit, vegetable or a meat product, is substantially less than the amount required to fill the container, and as a result a certain portion of the product being canned is exposed above the level of liquid so that it is not subjected to the same sterilizing and heating operation as the material below the level of the liquid and the exposed portion becomes non-uniform as to texture, flavor and color. In home canning it has not been considered practical to effect a precooking or exhausting of the product being canned so as to remove air and other gases from the food product and the liquid. In certain of the canning processes, the lids or closures for the containers are sterilized separately and must be handled in a sterile manner during application to the container and an additional sterile liquid is added to the container to make up the amount of liquid which was lacking during the sterilizing operation.

None of these methods provide the most desirable food product, or the most desirable processing; and, in accordance with the instant invention, a method and apparatus is provided which enables sterilizing of the product in the container in which it is to be canned, simultaneous sterilizing of the closure for the container, and insuring covering of the product with liquid during the pre-cooking and sterilizing operations.

Accordingly, it is a general object of the invention to provide new and improved methods and apparatus for canning food products and for sterilizing in the container and with the container closure.

Another object of the invention is to provide a method of sterilizing food products in which they are completely covered with liquid in the container in which they are to be canned during the sterilizing operation.

A further object of the invention is to provide during the sterilizing operation of a product in the container in which it is to be canned, an expansion chamber above the container which provides for expansion of the liquid in the container during sterilizing and for subsequent return of the expanded liquid to the container.

The above and other objects of the invention are attained as illustrated in the accompanying drawings, showing a preferred embodiment of the invention, in which:

Figure 1 is an elevational view of a container assembly or package conditioned for sterilizing operation.

Figure 2 is a vertical sectional view through the container package shown in Figure 1.

Figure 3 is a plan view of the partition provided at the bottom of the expansion chamber and engaging over the top of the container itself.

Referring to the drawings, the apparatus of the instant invention includes a container for canning foods such as a conventional glass jar 10 known in the trade as a "Mason" or "Ball" jar. This jar is provided with a conventional threaded neck 11 at its upper end on which an expansion chamber member 12 is threaded. The member 12 is provided with a shoulder 13 which overlies the end surface 14 of the jar 10 and at its upper end is provided with an externally threaded portion 16, the threads of which correspond to the threads 11 in the jar 10, so that it is adapted to receive a conventional cap 17 for such jars and the usual sealing lid 18 for such jars. Between the shoulder 13 and the jar end 14, a restraining member 21 is provided having an edge portion clamped between the shoulder 13 and the end 14 with a seal 22 interposed. The restraining member or partition 21 is provided with perforations 15 which are sufficiently small that the product 24 within the jar 10 cannot pass therethrough, but which will pass liquid. The partition member 21 may be formed integrally with the expansion chamber member 12 or separately therefrom as shown, in which latter case, its form is quite similar to the lid 18 as seen most clearly in Figure 3.

The space 26 within the upper portion 16 of the member 12 and above the partition 21 provides an expansion space or chamber immediately above the container 10 into which the expanding liquid from the container can escape during heating and sterilizing of the product and the container together with its closure or lid, and from which the liquid can drain back into the jar 10 so that a completely full jar of liquid will remain.

In carrying out the method of the instant invention, the jar 10 has a desired amount of the product placed therein and is filled to its upper brim with the liquid in which the product is to be canned. Thereafter, an expansion chamber is provided above the jar by placing over the jar the expansion member 12 with the partition member 21 in place. The expansion member 12 is screwed down tightly to provide a liquid-tight joint with the container. The closure comprising the lid 18 and the cap 17 to be used with the jar 10 in closing the jar are then supported on the expansion chamber member 12 by being placed thereon either loosely or tightly as may be desired for the particular canning operation. The jar 10 with the expansion member 12 and the closure, comprising the lid 18 and the cap 17, then provide a complete package unit for the sterilizing or cooking operation. This entire package to be sterilized is then placed in a retort and subjected to a sterilizing temperature for sufficient time to effect sterilization, the usual times and temperatures being employed for the particular product being canned. During the sterilizing operation, the product 24 within the container is restrained below the level of liquid by the partition 21 while the liquid within the jar 10 expands and rises above the partition 21. If it is preferred to apply the lid 18 and the cap 17 tightly on the member 12, the expansion chamber 26 provides ample space for expanding of the gases above the liquid; however, it is preferred to apply the lid 18 and the cap 17 loosely so that any expanding gases can escape. After the sterilizing operation is completed, the entire package unit is sterile and is allowed to cool sufficiently so that the liquid contracts to within the jar 10 providing a jar completely filled with liquid. Thereafter the expansion member 12 is removed and the lid 18 and the cap 17 are applied directly to the jar 10, the product being at that time at a sufficient temperature so that a desired vacuum seal of the lid 18 will be effected. This completes the canning operation. It will be noted that during the entire sterilizing operation, the product 24 within the container is completely covered with liquid so that no discoloration or other undesirable results occur. If desired, during the sterilizing operation an amount of liquid slightly in excess of the amount which would initially fill the jar can be placed within the expansion chamber 26 above the partition 21 to insure a complete filling of the jar 10 irrespective of a reduction in volume of the product and the liquid during the cooking or sterilizing operation. This is particularly true of products which are not cooked before being placed in the jar 10.

While I have shown and described a preferred embodiment of the invention, it will be apparent that the invention is capable of modification and variation from the form shown so that its scope should be limited only by the scope of the claims appended hereto.

I claim:

1. A method of sterilizing food products in the container therefor which comprises filling a container with a desired amount of the product, filling the container substantially to the brim with liquid, providing an expansion chamber above the food-filled container in liquid-tight relation therewith, restraining movement of the product above the top of the container, supporting the closure for the container on the chamber to provide a complete package unit for sterilizing, subjecting the package unit to a sterilizing temperature for sufficient time to effect sterilization of the food product, the container, and the closure for the container, then allowing any expanded liquid to draw back into the container, removing the expansion chamber from the container and applying the closure to the container.

2. A method of sterilizing food products in the container therefor which comprises filling a container with a desired amount of the product, filling the container substantially to the brim with liquid, providing an expansion chamber above the food-filled container in liquid-tight relation therewith, restraining movement of the product above the top of the container, then subjecting the container to a sterilizing temperature for sufficient time to effect sterilization of the food product and the container, then allowing any expanded liquid to drain back into the container, removing the expansion chamber from the container and applying a sterilized closure to the container.

3. The combination with a container for a food product to be canned, of an expansion chamber member having means for attaching to the container in liquid-tight relation therewith at its open end, said expansion chamber member including a partition overlying the top of the container, said expansion chamber member also having means for supporting the closure for the container.

4. The combination with a container for a food product to be canned, of an expansion chamber member having means for attaching to the container in liquid-tight relation therewith about its open end, said expansion chamber member including restraining means overlying the product in the container, said expansion chamber member also having means for supporting the closure for the container.

5. The combination with a container for a food product to be canned, of an expansion chamber member having means for attaching to the container in liquid-tight relation therewith about its open end, said expansion chamber member including restraining means overlying the product in the container.

6. An expansion chamber member for use in the sterilizing of food products in a container, said member comprising an annular ring, one end of said ring having an internally threaded lower portion adapted to engage over the threaded end of the container, the upper portion of said expansion member being of lesser diameter than said lower portion, a shoulder provided between said portions to overlap the end of the container threadedly engaged with said lower portion, a partition member at said shoulder for extending across the open end of the container, said partition member having perforations for establishing communication from a container to the upper portion of said expansion member while restraining said products, and said upper portion having means to support a closure for the container.

7. An expansion chamber member for use in the sterilizing of food products in a container, said member having a first portion adapted to engage the open end of the container and a second portion providing an expansion chamber above the container, and a partition member for extending across the open end of the container for establishing communication between said expansion chamber and a container while restraining upward movement of the food products being sterilized.

8. An expansion chamber member for use in the sterilizing of food products in a container, said member having a portion forming an expansion chamber and adapted to engage the open end of the container, and a partition member for extending across the container to establish communication between said chamber and a container and to restrain movement of the fruit above a desired level.

References Cited in the file of this patent

UNITED STATES PATENTS

| | | |
|---|---|---|
| 720,471 | Perley | Feb. 10, 1903 |
| 1,342,321 | Beler | June 1, 1920 |
| 1,554,066 | Boras | Sept. 15, 1925 |
| 1,654,914 | Beery | Jan. 3, 1928 |
| 2,093,189 | Edmunds | Sept. 14, 1937 |
| 2,158,923 | Baron | May 16, 1939 |